Jan. 13, 1925.
H. L. STALEY
1,522,656
MACHINE FOR CLEANING HANDHOLE PLATES
Filed June 30, 1921  3 Sheets-Sheet 1
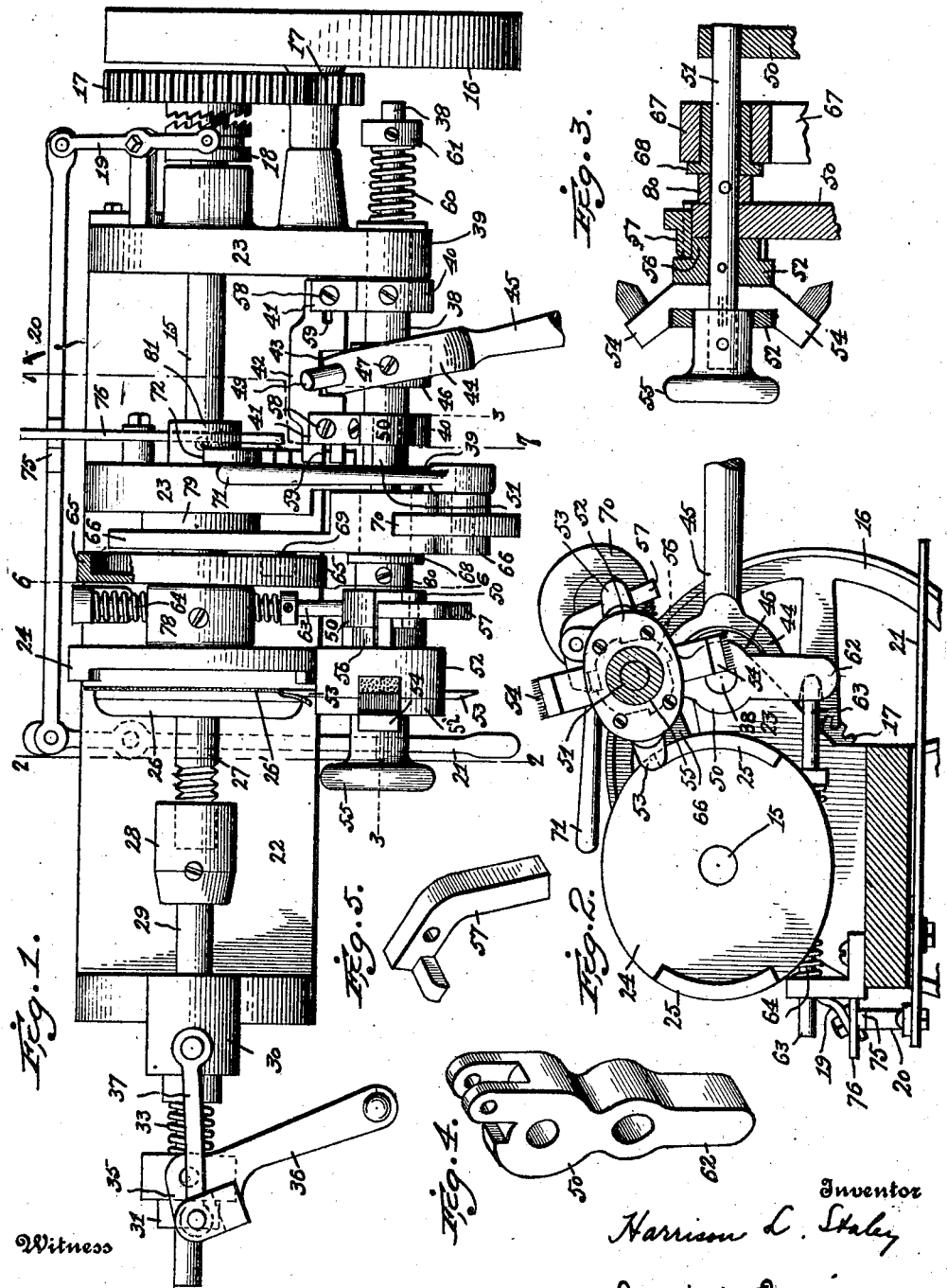

Jan. 13, 1925.
H. L. STALEY
1,522,656
MACHINE FOR CLEANING HANDHOLE PLATES
Filed June 30, 1921  3 Sheets-Sheet 2
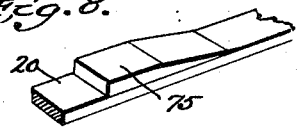
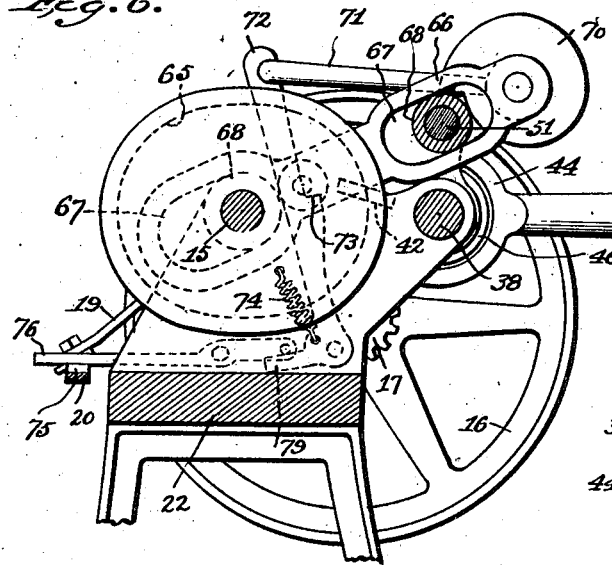
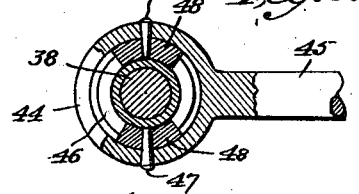
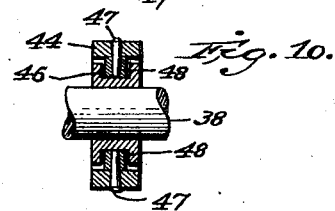
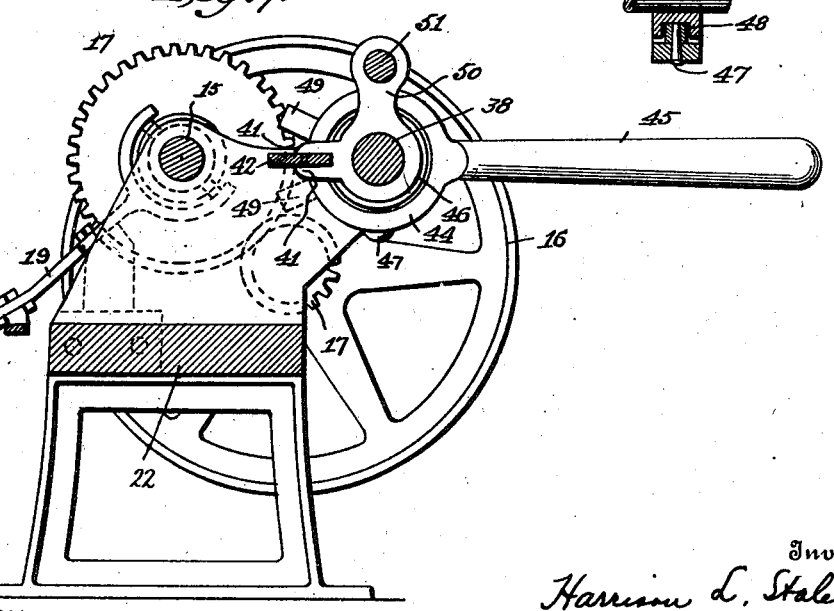
Inventor
Harrison L. Staley
Davis & Davis
Attorneys

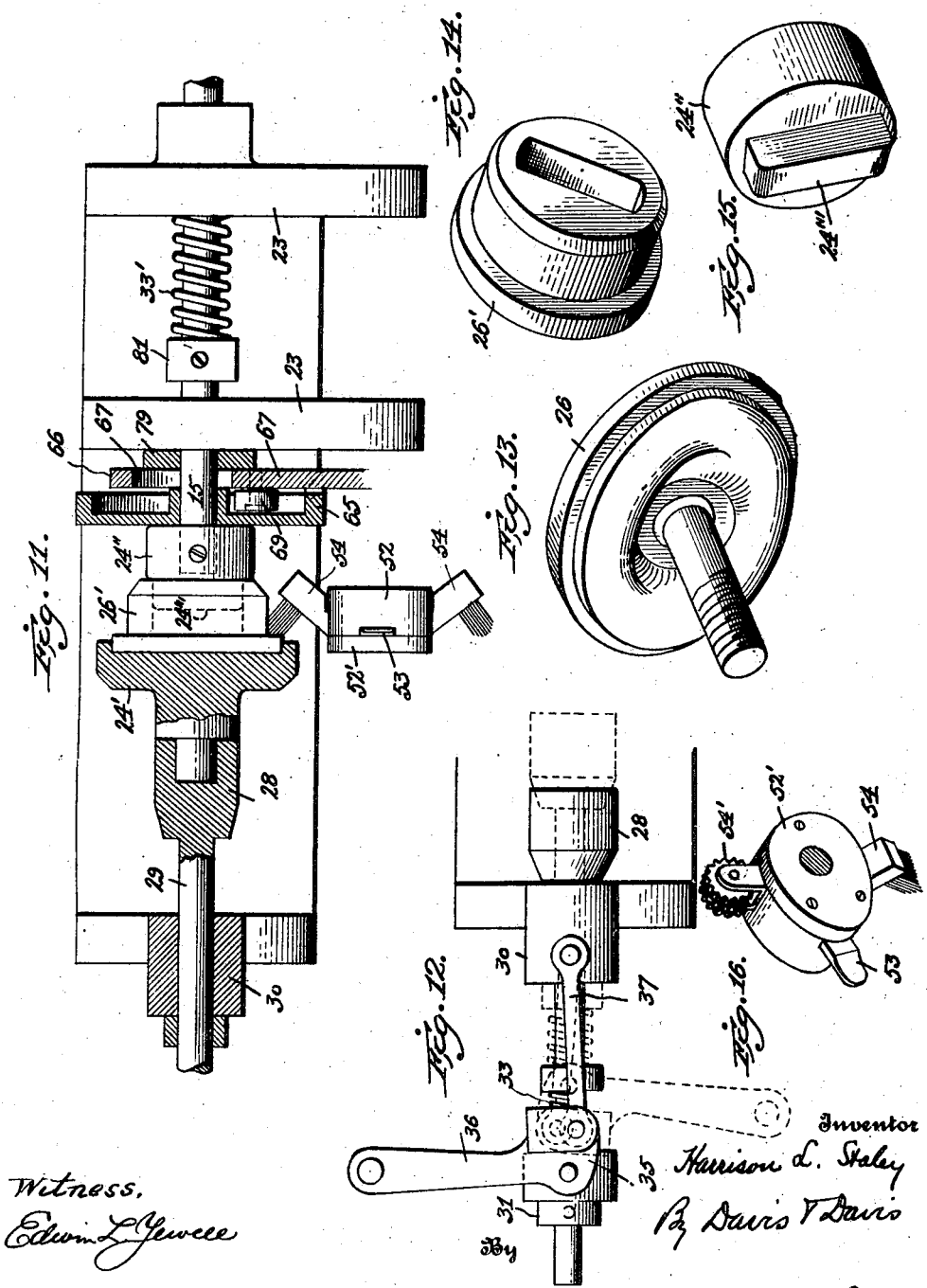

Patented Jan. 13, 1925.

1,522,656

UNITED STATES PATENT OFFICE.

HARRISON L. STALEY, OF RICHMOND, VIRGINIA.

MACHINE FOR CLEANING HANDHOLE PLATES.

Application filed June 30, 1921. Serial No. 481,645.

*To all whom it may concern:*

Be it known that I, HARRISON L. STALEY, a citizen of the United States of America, and a resident of Richmond, county of Henrico, and State of Virginia, have invented certain new and useful Improvements in Machines for Cleaning Handhole Plates, of which the following is a full and clear specification.

When hand-hole-plates are removed from the boiler for the purpose of renewing the gaskets, the hardened gaskets stick fast to the flanges of the plates and they must be removed in order that the fresh gaskets may function properly. The hardened and partly-disintegrated gaskets, prior to my invention, were removed by hand, chisels, files and brushes being employed for this purpose. Obviously, this was a laborious and expensive operation. It is the object of my invention to provide a simple and efficient machine for rapidly and inexpensively doing this work, the machine being especially adapted to be driven by power, but being entirely capable of being driven manually.

In the drawings—

Fig. 1 is a plan view, partly in section, of a machine for carrying out my invention;

Fig. 2 is a transverse sectional view on the line 2—2 of Fig. 1;

Fig. 3 is a longitudinal sectional view on the line 3—3 of Fig. 1;

Figs. 4 and 5 are views of details hereinafter described;

Fig. 6 is a transverse sectional view on the line 6—6 of Fig. 1;

Fig. 7 is a transverse sectional view on the line 7—7 of Fig. 1;

Figs. 8, 9 and 10 are views of details hereinafter described;

Fig. 11 is a view partly in plan and partly in section of a modified arrangement, which is desirable when the machine is adapted for cleaning circular hand-hole-plates;

Fig. 12 is a plan view of the devices for manipulating the thrust-shaft;

Figs. 13 and 14 are perspective views, respectively, of the elliptical and circular types of hand-hole-plates;

Fig. 15 is a detail perspective view of one of the chuck members shown in the modified machine, Fig. 11;

Fig. 16 is a side elevation of a tool-head carrying the set of tools that is preferred.

In the drawings, 15 designates the main shaft which is adapted to be driven from a power-wheel 16 through the medium of gears 17, the gear on the main shaft being adapted to be locked thereto by a sliding clutch-member 18 mounted on the shaft, this clutch-member being adapted to be shifted into and out of operation by means of a pivoted lever 19, a link 20 and a pivoted hand-lever 21, the latter being pivoted on the base 22 of the machine, the handle-end projecting forwardly so as to be within convenient reach of the operator.

The shaft 15 is journaled in two upstanding bearings 23. On the end opposite the gearing is affixed an elliptical work-head 24 whose face carries a pair of curved lugs 25 arranged at opposite sides of the head and between which the flanged hand-hole-plate 26 rests when it is pressed against the face of the head by mechanism hereinafter described, these lugs 25 serving to prevent the plate rotating on the head while being subjected to the action of the tools hereinafter described.

The hand-hole-plate 26 is provided with the usual screw-stem 27, and this stem is inserted into a socket 28 affixed to the inner end of a rotatable thrust-shaft 29 journaled in a bearing 30 upstanding from the base, this shaft being in axial alinement with the main shaft 15 and being endwisely slidable on the bearing 30.

Affixed to the outer end of the shaft 29 is a collar 31. To give room for inserting the stem of the hand-hole-plate in the socket 28, the shaft 29 may be slid outwardly until the outer end of the socket strikes or approaches close to the bearing 30, and after the stem of the hand-hole-plate is inserted in the socket 28, the thrust-shaft 29 is then pushed inwardly to bring the face of the hand-hole-plate practically into contact with the adjacent face of the work-head 24. To form this endwise adjustment of the shaft 29, I may provide any simple mechanism; I have illustrated a hand-lever 36 pivoted on the fixed collar 31 and having a short arm 35, the end of which short arm is pivotally connected by a link 37 to the bearing 30. It will be observed that by swinging the lever 36 toward the left until it points backwardly, as in Fig. 12, the shaft 29 will be drawn out to the limit in a leftward direction, and that by swinging the lever back to a position about at right-angles to the shaft 29, as shown in dotted lines in Fig. 12, the hand-hole-plate 26 will be brought to bear upon the head-chuck 24; and by a slight further movement of the hand-lever 36, a final thrust to the shaft 29 will be given, thereby compressing the spring 33 and swinging the link 37 over center to locking position, as shown in Fig. 1. Thus compressing the spring 33 causes the hand-hole-plate to have a resilient pressure against the head-chuck 24; the object of this is to compensate for slight differences in the lengths of the stems 27 of the hand-hole-plates.

A shaft 38 is rockingly and slidably supported in forward extensions 39 of the bearings 23. This shaft is adapted to be rocked to a limited extent as well as to be slid back and forth endwisely to a limited extent through the medium of any suitable manually-manipulatable mechanism; for the purpose of illustration, I show the following mechanism: Affixed to the shaft, a suitable distance apart, is a pair of collars 40 having inwardly-extending lugs 41 to which is slidingly secured a bar 42, this bar lying parallel to the shaft 38 and to the rear thereof and being provided with a notch 43 in its outer edge. Lying in this notch is the inner edge of a ring 44 carried at the inner end of the hand-lever 45, this ring being arranged to surround a collar 46 affixed to the rocker-shaft 38 and pivotally connected to the ring 44 at diametrically-opposite points by means of suitable pivots 47, these pivots carrying on their inner ends each a shoe 48 which works in an annular groove in the collar 46 to thereby permit the handle 45 and its ring 44 to have a limited universal movement with respect to the fixed collar 46. Projecting rearwardly from the ring 44 is a pair of stop-pins 49 which project rearwardly respectively above and below the bar 42. These pins 49 together with the notch 43 connect the ring 44 to the bar 42, but permit the ring to have a rotary movement to a limited extent independently of said bar 42, for the purpose hereinafter set forth.

Affixed to the rock-shaft 38 is a pair of upstanding arms 50, one of which is carried by one of the collars 40, and in the upper ends of these arms is journaled a tool-shaft 51. The rockability of the shaft 38 obviously permits the tool-shaft 51 to be bodily moved toward and from the power-shaft 15. This tool-shaft 51 is rotatable in its bearing, but it does not rotate during the operation of any one of the tools; it is made rotatable merely to permit the tools to be successively brought into action on the work. Affixed to one end of the tool-shaft, in transverse alinement with the head 24, is a tool-carrying head 52 which carries a series of radially-arranged tools, two of them (designated 53) being of the blade or cutter type and being arranged at diametrically-opposite points from the head, and the other two (designated 54) being of the brush type, i. e., radial arms carrying steel bristles so shaped and positioned as to abrade the gasket face of the hand-hole-plate as well as the adjacent circumferential face of the body-part of the plate. As will be observed, the tool that is projecting inwardly toward the power-shaft is the one that will be brought into action when the tool-shaft is moved bodily toward the main shaft. The tool-carrying head 52 is affixed to the tool-shaft, and to bring any one of the tools into position for operation it is simply necessary to rotate the tool-shaft in its bearings. A knob 55 is affixed to one end of the tool-shaft for convenience in thus rotating it, and to lock the tool-shaft in its adjusted position I provide a ratchet-wheel 56 which is affixed to the tool-shaft adjacent one of the bearings 50 and pivotally mount on said bearing 50 a spring-actuated pawl 57 adapted to be pressed out of action temporarily by pressure of the hand of the operator during the rotative positioning of the tool. After the desired tool is adjusted for operation, the tool-shaft may be bodily moved toward the work to bring the tool into action by simply raising the outer end of the handle 45. This movement of the handle 45 first takes up the lost-motion between the upper pin 49 and the bar 42, and then, by continued movement in the same direction, rocks the rocker-shaft 38 to thereby swing the arms 50 inwardly toward the work.

The tool in operation may be caused to press against the gasket-seat by sliding the rocker-shaft 38 toward the right by means of the handle 45; when the outer end of this handle is thus swung toward the right, the engagement of the inner edge of the ring 44 with the bar 42 forms a fulcrum, thereby causing the shaft 38, together with collars 40 and 46, to move endwisely toward the right, whereby the operator may force the tool against the gasket-seat with the necessary pressure to accomplish the desired work. It will be observed that the bar 42 is long enough to have its ends abut against the two main bearings 23, and to slidingly confine this bar 42 to the rearwardly-projecting ears 41, I provide pins 58 carried by the said ears 41 and extending through slots 59 formed in the bar 42. It is desirable for convenience in operation to provide means for normally pressing the tool to the right, i. e., toward the gasket-seat; to accomplish this I employ a coil-spring 60 surrounding the left-hand end of the rocker-shaft and caused to press against the adjacent bearing 23 by means of a collar 61 affixed to said rocker-shaft, but it will be understood, of course, that the amount of pressure with which the tool bears on the work will be largely determined by the pressure the operator applies to the handle 45. It will be observed also that in throwing the tool toward the work to put it into operation and in withdrawing it therefrom, the stop-pins 45 are merely for the purpose of giving a limited amount of lost-motion between the hand-lever-ring 44 and the bar 42 for the purpose hereinafter described.

For the purpose of relieving the operator of fatigue, it is desirable to not only normally force the tool against the gasket seat, as above described, but also to normally force it radially inwardly during the period of rotation of the work. This may be brought about by any suitable mechanism; for the purpose of illustration I provide the following mechanism: One of the upstanding arms 50 is provided with a depending arm 62, and this arm is normally forced outwardly, i. e., away from the work, by means of a rod 63 which is pressed outwardly by a coil-spring 64. With this spring-actuated device, the operator will not need in ordinary cases to exert much, if any, pressure on the tool, but the tool will always be under the control of the operator through the medium of handle 45. The lost-motion provided by means of the pins 49 being set away from the bar 42 is merely to enable the operator to maintain his hold upon the handle 45 without being fatigued by vibrations of the rocker-shaft, it being possible with this lost-motion device for the operator to swing the lever either up or down far enough to free both pins 49 from the bar 42 and thus prevent rocking vibrations of the rocker-shaft 38 being transmitted to the handle.

Occasionally there will be a gasket so hardened and stuck so fast that it would be greatly fatiguing on the operator to give sufficient pressure in addition to the spring 64 to effectively shave off the washer for the gasket. In such cases as these, it is desirable to have a means for locking the cutting or shaving tool in working position. For this purpose, I provide the following simple mechanism: Affixed to the work-shaft 15 is a disk having a laterally-extending flange 65, this flange being elliptical to correspond with the elliptical shape of the head 24, this machine being especially designed for cleaning elliptical hand-hole-plates. A sliding bar 66 is mounted upon the two shafts 15 and 51, slots 67 being provided for permitting the bar 66 to slide inwardly and outwardly, and rotatable collars 68 being provided on these shafts, respectively, to facilitate this sliding action. Affixed to the bar 66 is a roller-carrying pin 69 which is adapted to bear on the inner face of the elliptical flange 65 when the bar is pulled outwardly. To pull the bar outwardly, I provide a cam 70 whose shaft is journaled in the outer bifurcated end of the bar 66 and is adapted to be rocked by means of a hand-lever 71. The cam is so shaped that when the hand-lever 71 is thrown over inwardly, as shown in the drawing, the pin 69 will be positioned away from the flange 65, thereby rendering this locking device inactive. When it is desired to bring this locking device into action, it is simply necessary to throw the hand-lever 71 over outwardly to thus cause the cam to pull the roller-carrying pins 69 hard against the inner face of the flange 65, the cam being so shaped as to lock the parts in this position. This action bodily forces the tool-shaft 51 inwardly far enough to put the cutter in action. As the power-shaft revolves, the roller-pin 69 will be compelled to follow the elliptical path of the cam 65, thereby causing the tool-shaft and the tool carried thereby to move inwardly and outwardly to follow the elliptical gasket-seat.

It is necessary to hold the tool-shaft in its outermost, non-use, position while the work is being put into place in the machine. This may be done in any suitable manner; I have shown a latch 72 pivoted at its lower end to one of the pedestals 23 and having a shoulder 73 adapted to engage under the rear edge of the bar 42 to thus hold said bar in its up position, thereby locking the tool-shaft and its connected parts in off position. A coil-spring 74 normally tends to swing this latch into locking position, and to ensure this latch being swung to its off position when the machine is put into operation, I provide the following simple mechanism for shifting it to its off position automatically when the clutch is thrown in: Affixed to the long link 20 is a bevel-block 75 which, when the link 20 is shifted endwisely in a direction to put the clutch in, will raise the rear end of the lever 76 whose inner end is arranged to bear down upon an arm 77 extending rearwardly from the lower end of the latch 72, as shown in dotted lines in Fig. 6. When the clutch is thrown out, it will be seen that the bevel-block 75 is shifted laterally far enough to permit the spring 74 to come into action to throw the latch into locking position.

The reference numerals 78, 79, 80 and 81 designate collars mounted on the shafts 15 and 51 to assist in properly spacing the parts heretofore described.

In Fig. 11 I show a desirable re-arrangement of some of the parts for cleaning circular hand-hole-plates 26'. In this arrangement, the hand-hole-plate is reversed and the tools 53 and 54 are also reversed, the removable clamp-plate 52' on the tool-head permitting this reversal of the tools to be conveniently made. A chuck-head 24' is mounted in the socket 28 and shaped to receive the flange on the hand-hole-plate; and affixed to the adjacent end of the main shaft 15, instead of the chuck-head 24, is a chuck-head 24'' provided with a transverse lug 24''' which is adapted to fit into the usual slot in the inner end of the hand-hole-plate. In this apparatus, it is also desirable to mount a spring 33' on the main shaft 15 which normally tends to press the shaft 15 and its chuck-head 24'' against the hand-hole-plate, the collar 81 being used as an abutment for this spring.

In Fig. 16, I show a view to illustrate the preferred set of tools, consisting of a cutting-tool 53 and a brush 54, as heretofore described, and a cutter-wheel 54' which revolves loosely on its shaft, consisting as usual of a plurality of saw-toothed disks. As shown in this view, I prefer to give the tool-head a pear shape and mount the cutting-tool at the apex thereof to thus give a maximum of support to this tool, since the cutter is the tool that is required to perform the heaviest work.

It will be seen that the principle of operation of my machine is such that it may readily be applied to the cleaning of all the known types (circular, elliptical, oval, square) of hand-hole-plates.

The nature and scope of the invention having been thus indicated and its preferred embodiment having been specifically described, what is claimed as new is:

1. In a machine of the class set forth, a driven shaft carrying means for holding and rotating the hand-hole-plate, a parallel non-driven shaft and bearings in which the same is oscillatingly mounted, a tool-holder carried by this oscillating shaft, a spring for normally forcing the shaft in a direction to bring the tool laterally against the hand-hole-plate, and a lever attached to the oscillating shaft for manually forcing the shaft either in a direction opposed to the spring or in the opposite direction.

2. In a machine of the class set forth, a driven shaft carrying means for holding and rotating the hand-hole-plate, an oscillating parallel shaft and bearings slidingly supporting the same, a tool-holder mounted on this oscillating shaft, a single lever and devices whereby this lever may be operated to slide said oscillating shaft endwisely or rock it in its bearings, the devices for rocking the shaft embodying lost-motion mechanism whereby transmissal of the vibrations of the machine to the handle will be reduced to a minimum.

3. In a machine of the class set forth, a driven shaft carrying means for holding and rotating the hand-hole-plate, a tool-holder, means whereby the tool is normally moved toward the center of rotation of the hand-hole plate, manually-operable means for moving the tool-holder against the action of said spring, and a latch for holding the tool-holder away from the work when released from manual control.

4. In a machine of the class set forth, a driven shaft and means for chucking the hand-hole-plate thereto, an oscillating shaft mounted adjacent to the aforesaid shaft, a tool-holding member affixed to said oscillating shaft and having a tool attached to its upper end, a spring-actuated rod for engaging the lower end of said member to swing the same in a direction to force the tool toward the work, and a handle attached to said oscillating shaft to rock the shaft in either direction, for the purpose set forth.

5. In combination, a hand-hole-plate chuck and means for rotating the same, a tool-holder movable toward and from the center of rotation as well as parallel with the axis of rotation of the hand-hole-plate, and a single manually-operative lever and means actuated thereby for controlling both these movements.

6. In combination, a hand-hole-plate chuck and means for rotating the same, a tool-holder movable toward and from the center of rotation as well as parallel with the axis of rotation of the hand-hole-plate, and a single manually-operative lever and means actuated thereby for simultaneously controlling both these movements.

7. In combination, a driven shaft and means for clamping a hand-hole-plate thereto so as to rotate therewith, a rotatively-adjustable tool-holder and means for moving it toward and from the work, said tool-holder carrying a plurality of different tools, and means for locking the tool-holder in its adjusted position, said means for moving the tool-holder toward and from the work consisting of a manually-operable handle and an oscillating frame associated with said handle.

8. In combination, a driven shaft and means for clamping a hand-hole-plate thereto so as to rotate therewith, a tool-holder and means for moving it toward and from the work, said tool-holder carrying a plurality of different tools, and means for locking the tool-holder in its adjusted position, this latter means embodying a ratchet-wheel affixed to the tool-holder and a locking pawl mounted on the adjacent part of the machine.

9. In combination, a driven shaft adapted to carry a hand-hole-plate, a frame oscillating on an axis parallel to the driven shaft, a tool-holder on said frame, and means for oscillating said frame consisting of a spring moving it in one direction and a manual means for moving it in the opposite direction against the action of said spring.

10. In combination, a driven shaft adapted to carry a hand-hole-plate, a frame oscillating on an axis parallel to the driven shaft, a tool-holder on said frame, and manual means for oscillating said frame, said frame being also capable of movement in a direction parallel to the axis of rotation of the hand-hole-plate.

11. In combination, a driven shaft and means for clamping the hand-hole-plate thereto, a frame adapted to oscillate on an axis parallel with the driven shaft and also to bodily move laterally while lying parallel with said axis, a tool-holder on said frame, and a single handle for manipulating said tool-carrying frame.

12. In combination, a driven shaft and means for clamping the hand-hole-plate thereto, a frame adapted to oscillate on an axis parallel with the driven shaft and also to bodily move laterally while lying parallel with said axis, a tool-holder on said frame, and a single handle for manipulating said tool-carrying frame, spring-actuated devices being provided for normally tilting said frame toward the work and also moving it laterally.

13. In combination, a driven shaft carrying chuck means for holding the hand-hole-plate, a tool-holder and a movable frame carrying the same, spring means for normally pressing the tool toward the work, manual means for shifting the frame to bring the tool into action, and a latch for locking the frame in position to keep the tool out of action.

14. In combination, a driven shaft carrying chuck means for holding the hand-hole-plate, a tool-holder and a movable frame carrying the same, manual means for shifting the frame to bring the tool into action, a latch for locking the frame in position to keep the tool out of action, power means for driving said driven shaft, manually-operated means for putting this power means into action, and means whereby when this manual means is operated to put the power into action said latch is moved to unlatching position and held there while the power mechanism is in operation.

15. In combination, a driven shaft carrying chuck means adapted to clamp a non-circular hand-hole-plate, a tool-holder, and positive means actuated from said shaft for causing the tool to positively follow an elliptical path on the hand-hole-plate, and means for manually pressing the tool laterally against the hand-hole plate.

16. In combination, a driven shaft carrying chuck means adapted to clamp a non-circular hand-hole-plate, a tool-holder, and means actuated from said shaft for causing the tool to follow an elliptical path on the hand-hole-plate, said means embodying an elliptical flange on said shaft and a roller working against the inner face of said flange and devices whereby said roller may be moved inwardly to inactive position to enable the tool-holder to be manipulated manually, manual means being provided for forcing the tool laterally against the work during its elliptical travel.

17. In combination, a driven shaft carrying chuck means adapted to clamp a non-circular hand-hole-plate, a tool-holder, and means actuated from said shaft for causing the tool to follow the non-circular gasket path on the hand-hole-plate, said means embodying an elliptical flange driven from said shaft, a movable frame for the tool-holder, and devices connecting said frame to said flange to cause the frame to move in and out as the elliptical flange rotates, means being provided whereby said connecting devices may be released to permit the tool-holder to be manipulated by hand, manual means being provided for forcing the tool laterally against the work during its elliptical travel.

18. In combination, a driven shaft carrying a chuck adapted to clamp a non-circular hand-hole-plate, a tool-holder, and means positively actuated in both directions from said shaft for causing the tool to follow the non-circular gasket path on the hand-hole-plate, said means embodying devices whereby said means may be rendered inactive to thereby permit the tool-holder to be manipulated by hand, manual means being provided for forcing the tool laterally against the work during its elliptical travel.

19. In a machine of the class set forth, a driven shaft carrying a chuck adapted to clamp a hand-hole-plate, a tool-holder adapted to be bodily moved inwardly toward the center of rotation of said shaft as well as laterally, and manually-operable means for simultaneously moving the tool-holder inwardly as well as laterally.

20. In a machine of the class set forth, a driven shaft carrying a chuck adapted to clamp a hand-hole-plate, a tool-holder adapted to be bodily moved inwardly toward the center of rotation of said shaft as well as laterally, and spring means for normally moving the tool-holder inwardly as well as laterally to thereby resiliently hold the tool to its work.

21. In a machine of the class set forth, a driven shaft carrying a chuck adapted to clamp a hand-hole-plate, a tool-holder adapted to be bodily moved inwardly toward the center of rotation of said shaft as well as laterally, and resilient means for forcing the tool laterally with a resilient pressure.

22. In a machine of the class set forth, a driven shaft carrying a chuck adapted to clamp a hand-hole-plate, a tool-holder adapted to be bodily moved inwardly toward the center of rotation of said shaft as well as laterally, resilient means for forcing the tool inwardly, and manual means for withdrawing the tool outwardly against the action of said resilient means.

In testimony whereof I hereunto affix my signature.

HARRISON L. STALEY.